United States Patent
Hanson et al.

(10) Patent No.: US 6,408,637 B1
(45) Date of Patent: *Jun. 25, 2002

(54) APPARATUS AND METHOD FOR RECOVERING AND RECYCLING REFRIGERANT

(75) Inventors: Arnold M. Hanson, Minneapolis; Badr Alossaimi, Prior Lake; Thomas D. Chandler, Coon Rapids, all of MN (US)

(73) Assignee: Century Mfg. Co., Bloomington, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/430,842

(22) Filed: Nov. 1, 1999

(51) Int. Cl.⁷ .............................................. F25B 45/00
(52) U.S. Cl. .................... 62/292; 62/77; 62/475
(58) Field of Search .................... 62/85, 77, 292, 62/475

(56) References Cited

U.S. PATENT DOCUMENTS

| | | |
|---|---|---|
| 3,232,070 A | 2/1966 | Sparano |
| 3,699,781 A | 10/1972 | Taylor |
| 3,850,009 A | 11/1974 | Villadsen |
| 3,974,659 A * | 8/1976 | Edwards .................... 62/85 X |
| 4,261,178 A | 4/1981 | Cain |
| 4,285,206 A | 8/1981 | Koser |
| 4,363,222 A | 12/1982 | Cain |
| 4,364,236 A | 12/1982 | Lower et al. |
| 4,441,330 A | 4/1984 | Lower et al. |
| 4,458,841 A | 7/1984 | Laakaniemi et al. |
| 4,476,688 A | 10/1984 | Goddard |
| 4,480,446 A | 11/1984 | Margulefsky et al. |

(List continued on next page.)

FOREIGN PATENT DOCUMENTS

| | | |
|---|---|---|
| DE | 39 14252 A1 | 10/1990 |
| EP | 0 385 700 A1 | 9/1990 |
| EP | 0 452 534 A2 | 10/1991 |
| WO | WO 91/00484 | 1/1991 |

*Primary Examiner*—Michael Powell Buiz
*Assistant Examiner*—Chen-Wen Jiang
(74) *Attorney, Agent, or Firm*—Merchant & Gould P.C.

(57) ABSTRACT

An apparatus for recovering and recycling refrigerant is provided. The apparatus includes a separation unit, a compressor, and a receiver tank. The separation unit is provided for condensing compressed refrigerant and for vaporizing contaminated refrigerant. The separation unit includes a multichamber structure having a high pressure region and a low pressure region. The high pressure region includes a high pressure inlet for providing compressed refrigerant vapor to the high pressure region, a high pressure outlet for removing condensed refrigerant from the high pressure region, and a compressor oil outlet for removing compressor oil from the high pressure region. The low pressure region includes a low pressure inlet for introducing contaminated refrigerant into the low pressure region, a low pressure outlet for removing vaporized refrigerant from the low pressure region, and a refrigerant oil outlet for removing refrigerant oil from the low pressure region. The compressor is provided for compressing refrigerant from the low pressure outlet of the separation unit to provide compressed refrigerant for feeding to the high pressure inlet of the separation unit. The receiver tank is provided for receiving condensed refrigerant from the high pressure outlet of the separation unit. A method for recovering and recycling refrigerant is provided.

9 Claims, 9 Drawing Sheets

U.S. PATENT DOCUMENTS

| | | | |
|---|---|---|---|
| 4,513,578 A | 4/1985 | Proctor et al. | |
| 4,539,817 A | 9/1985 | Staggs et al. | |
| 4,554,792 A | 11/1985 | Margulefsky et al. | |
| 4,646,527 A | 3/1987 | Taylor | |
| 4,688,388 A | 8/1987 | Lower et al. | |
| 4,766,733 A | 8/1988 | Scuderi | |
| 4,768,347 A | 9/1988 | Manz et al. | |
| 4,776,174 A | 10/1988 | Rich et al. | |
| 4,805,416 A | 2/1989 | Manz et al. | |
| 4,809,515 A | 3/1989 | Houwink | |
| 4,809,520 A * | 3/1989 | Manz et al. | 62/292 |
| 4,862,699 A | 9/1989 | Lounis | |
| 4,881,961 A | 11/1989 | Mock | |
| 4,903,499 A | 2/1990 | Merritt | |
| 4,909,042 A | 3/1990 | Proctor et al. | |
| 4,938,031 A | 7/1990 | Manz et al. | |
| 4,939,903 A | 7/1990 | Goddard | |
| 4,942,741 A | 7/1990 | Hancock et al. | |
| 4,967,570 A | 11/1990 | Van Steenburgh, Jr. | |
| 4,969,495 A | 11/1990 | Grant | |
| 4,981,020 A | 1/1991 | Scuderi | |
| 4,982,576 A | 1/1991 | Proctor et al. | |
| 4,993,461 A | 2/1991 | Yamane | |
| 4,998,413 A | 3/1991 | Sato et al. | |
| 5,005,369 A | 4/1991 | Manz | |
| 5,005,375 A | 4/1991 | Manz et al. | |
| 5,012,651 A | 5/1991 | Nakatani et al. | |
| 5,018,361 A | 5/1991 | Kroll et al. | |
| 5,020,331 A | 6/1991 | Michny | |
| 5,022,230 A | 6/1991 | Todack | |
| 5,024,061 A | 6/1991 | Pfeil, Jr. et al. | |
| 5,034,743 A | 7/1991 | Deppe et al. | |
| 5,038,578 A | 8/1991 | Manz et al. | |
| 5,040,382 A | 8/1991 | Abraham | |
| 5,050,388 A | 9/1991 | Packo | |
| 5,050,401 A | 9/1991 | Van Steenburgh, Jr. | |
| 5,063,749 A | 11/1991 | Manz | |
| 5,067,325 A | 11/1991 | Åhman | |
| 5,067,327 A | 11/1991 | Leblanc | |
| 5,088,291 A | 2/1992 | Squires | |
| 5,090,211 A | 2/1992 | Peters | |
| 5,094,087 A | 3/1992 | Gramkow | |
| 5,094,277 A | 3/1992 | Grant | |
| 5,095,713 A | 3/1992 | Laukhuf et al. | |
| 5,099,653 A | 3/1992 | Major et al. | |
| 5,115,645 A | 5/1992 | Abraham | |
| 5,123,259 A | 6/1992 | Morgan, Sr. | |
| 5,157,936 A * | 10/1992 | Wall | 62/292 |
| 5,161,385 A | 11/1992 | Schumacher | |
| 5,172,562 A | 12/1992 | Manz | |
| 5,195,333 A | 3/1993 | Van Steenburgh, Jr. | |
| 5,203,177 A | 4/1993 | Manz et al. | |
| 5,211,024 A | 5/1993 | Manz et al. | |
| 5,214,927 A | 6/1993 | Squires | |
| 5,243,832 A | 9/1993 | Van Steenburgh, Jr. | |
| 5,245,840 A | 9/1993 | Van Steenburgh, Jr. | |
| 5,325,675 A | 7/1994 | Manz et al. | |
| 5,327,741 A | 7/1994 | Mason et al. | |
| 5,353,603 A | 10/1994 | Outlaw et al. | |
| 5,367,888 A | 11/1994 | Muston et al. | |
| 5,377,499 A | 1/1995 | Zugibe | |
| 5,377,501 A * | 1/1995 | Muston | 62/292 |
| 5,379,607 A | 1/1995 | Sergius | |
| 5,396,774 A * | 3/1995 | Hubbell, Jr. | 62/77 |
| 5,406,806 A | 4/1995 | Ricketts et al. | |
| 5,442,930 A | 8/1995 | Stieferman | |
| 5,469,714 A * | 11/1995 | Manz et al. | 62/292 X |
| 5,533,359 A | 7/1996 | Muston et al. | |
| 5,535,595 A * | 7/1996 | Manz | 62/85 |
| 5,617,731 A | 4/1997 | Scaringe | |
| 5,806,328 A | 9/1998 | Muston et al. | |
| 5,943,867 A * | 8/1999 | Thomas et al. | 62/85 |
| 6,016,661 A * | 1/2000 | Sagar | 62/292 X |

* cited by examiner

APPARATUS AND METHOD FOR RECOVERING AND RECYCLING REFRIGERANT

FIELD OF THE INVENTION

The invention relates to an apparatus and method for recovering and recycling refrigerant from an air conditioning unit.

BACKGROUND OF THE INVENTION

Most modem air conditioning equipment employ one of several organic solvent compositions, commonly referred to as chlorofluorocarbon compounds (CFCs), as a working fluid (refrigerant). For various reasons, such as wearing of the seals in the air conditioning equipment's compressor, the refrigerant in the equipment may eventually become contaminated with dirt, oil and/or moisture. These contaminants affect the efficiency of the equipment and may eventually lead to damage of the compressor and other components in the equipment. Thus, it is desirable to replace the refrigerant periodically to avoid damaging the equipment and to restore the equipment's overall efficiency. Also, in the event of a failure of the equipment, it is typically required that the refrigerant be removed from the equipment prior to servicing.

Previously, the most common method of removing the refrigerant from the equipment was to vent the refrigerant into the atmosphere and to replace it with virgin refrigerant as required. However, problems exist with this method of removing the refrigerant. The release of CFC compounds into the atmosphere results in the depletion of the ozone layer therein. As the ozone layer is the principal filter in the atmosphere for removing the sun's ultraviolet radiation, much concern has been expressed about its depletion as it is expected to lead to many problems. For example, it is expected that an upturn in related health problems such as skin cancer will occur. Accordingly, many governments are passing legislation restricting or prohibiting the use of and/or releases of CFC compounds into the atmosphere. These restrictions pose a serious problem to refrigeration equipment manufacturers and servicers who no longer can release CFC-type refrigerants into the atmosphere. Furthermore, replacing refrigerant which has been vented to the atmosphere is expensive and may be difficult to obtain.

Refrigerant recovery and recycling systems are described in, for example, U.S. Pat. Nos. 3,699,781; 4,285,206; 4,364,236; 4,805,416; 4,768,347; 4,809,520; 5,072,593; 5,245,840; 5,335,512; 4,809,520; 5,353,603; 5,617,731; and 5,934,091.

SUMMARY OF THE INVENTION

An apparatus for recovering and recycling refrigerant is provided. The apparatus includes a separation unit, a compressor, and a receiver tank. The separation unit is provided for condensing compressed refrigerant and for vaporizing contaminated refrigerant. The separation unit includes a multichamber structure having a high pressure region and a low pressure region. The high pressure region includes a high pressure inlet for providing compressed refrigerant vapor to the high pressure region, a high pressure outlet for removing condensed refrigerant from the high pressure region, and a compressor oil outlet for removing compressor oil from the high pressure region. The low pressure region includes a low pressure inlet for introducing contaminated refrigerant into the low pressure region, a low pressure outlet for removing vaporized refrigerant from the low pressure region, and a refrigerant oil outlet for removing refrigerant oil from the low pressure region. The compressor is provided for compressing refrigerant from the low pressure outlet of the separation unit to provide compressed refrigerant for feeding to the high pressure inlet of the separation unit. The receiver tank is provided for receiving condensed refrigerant from the high pressure outlet of the separation unit.

The apparatus preferably includes a manifold assembly. The manifold assembly is provided for controlling the flow of processing fluid through the apparatus. The manifold assembly includes several passageways for directing the flow of processing fluid. For example, the manifold assembly preferably includes two or more of the following lines: a contaminated refrigerant recovery line; a vaporized refrigerant line; a compressed refrigerant line; and a condensed refrigerant line. The contaminated refrigerant recovery line is provided for directing contaminated refrigerant into the low pressure region of the separation unit. The vaporized refrigerant line is provided for directing vaporized refrigerant from the low pressure region of the separation unit to the compressor. The compressed refrigerant line is provided for directing compressed refrigerant into the high pressure region of the separation unit. The condensed refrigerant line is provided for directing condensed refrigerant from the high pressure region of the separation unit to the receiver tank. Valves can be provided on each of these lines for directing flow through the lines. The valves are preferably solenoid valves and are preferably controlled by a microprocessor.

The apparatus for recovering and recycling refrigerant can include a filter for filtering the contaminated refrigerant prior to introduction into the separation unit. The filter preferably includes a magnet for attracting metallic particulates. In addition, the filter preferably includes a screen for obstructing the flow of particular sized particulates or fibers into the separation unit. Preferably, the filter including a magnet is provided upstream of any solenoid valves.

A method for recovering and recycling refrigerant is provided by the invention. The method can be implemented using the apparatus of the invention. The method can include steps of feeding contaminated refrigerant to the separation unit; compressing the vaporized refrigerant from the low pressure outlet of the separation unit to provide compressed refrigerant vapor; feeding the compressed refrigerant vapor to the high pressure inlet of the high pressure region of the separation unit; separating oil from the compressed refrigerant and recovering the oil in the separation unit; condensing the compressed refrigerant vapor to provide condensed refrigerant in the separation unit; and feeding the condensed refrigerant to the receiver tank.

BRIEF DESCRIPTION OF THE DRAWINGS

A preferred embodiment of the invention will now be described by way of example only, with reference to the attached figures wherein:

FIGS. 9 (a)–(c) shows a process flow diagram depicting a preferred operation of a portable apparatus for recovering and recycling refrigerant according to the principles of the invention.

DETAILED DESCRIPTION OF THE PREFERRED EMBODIMENT

Figure 1:
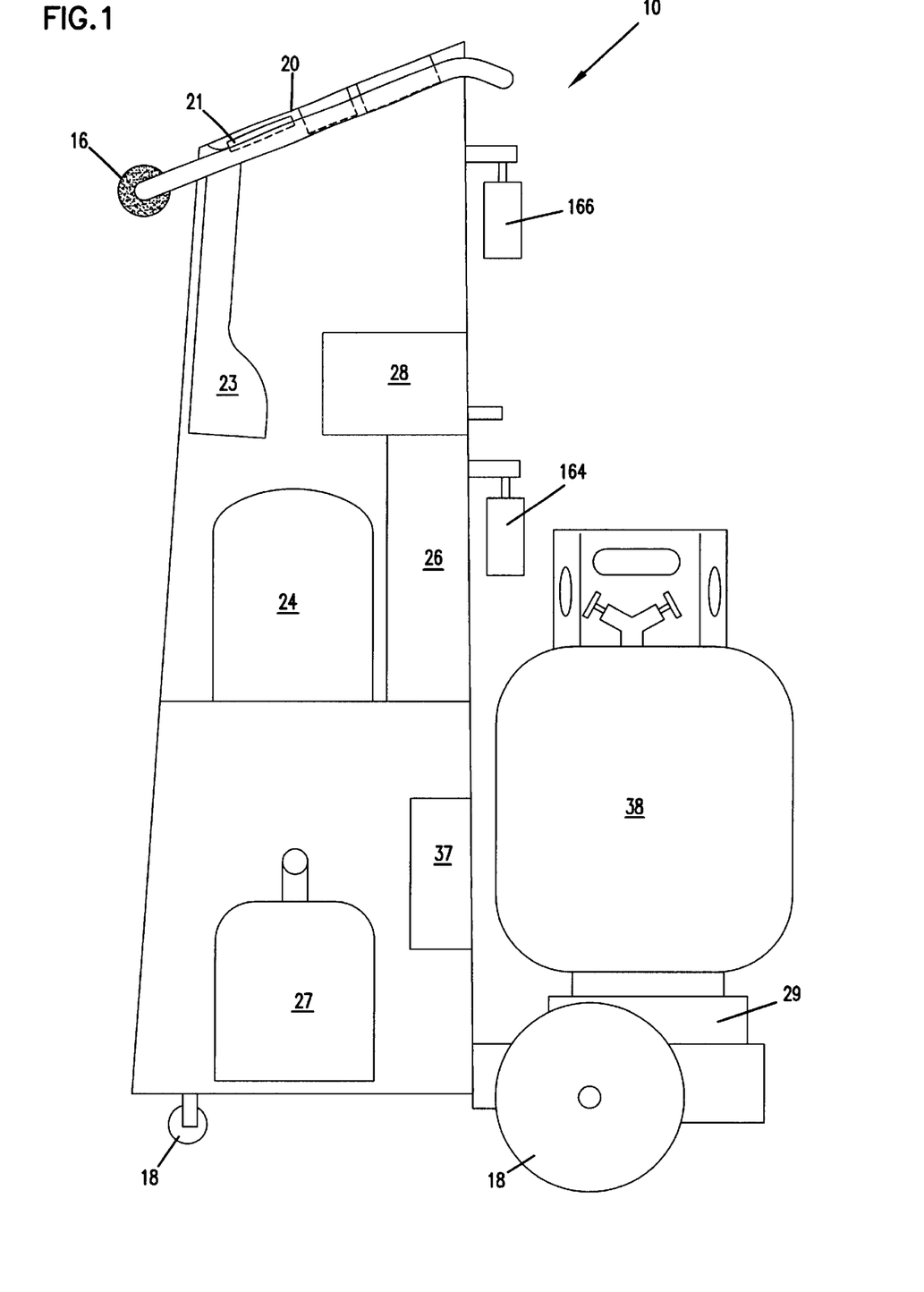
FIG. 1 is a portable apparatus for recovering and recycling refrigerant according to the principles of the invention.
Figure 2:
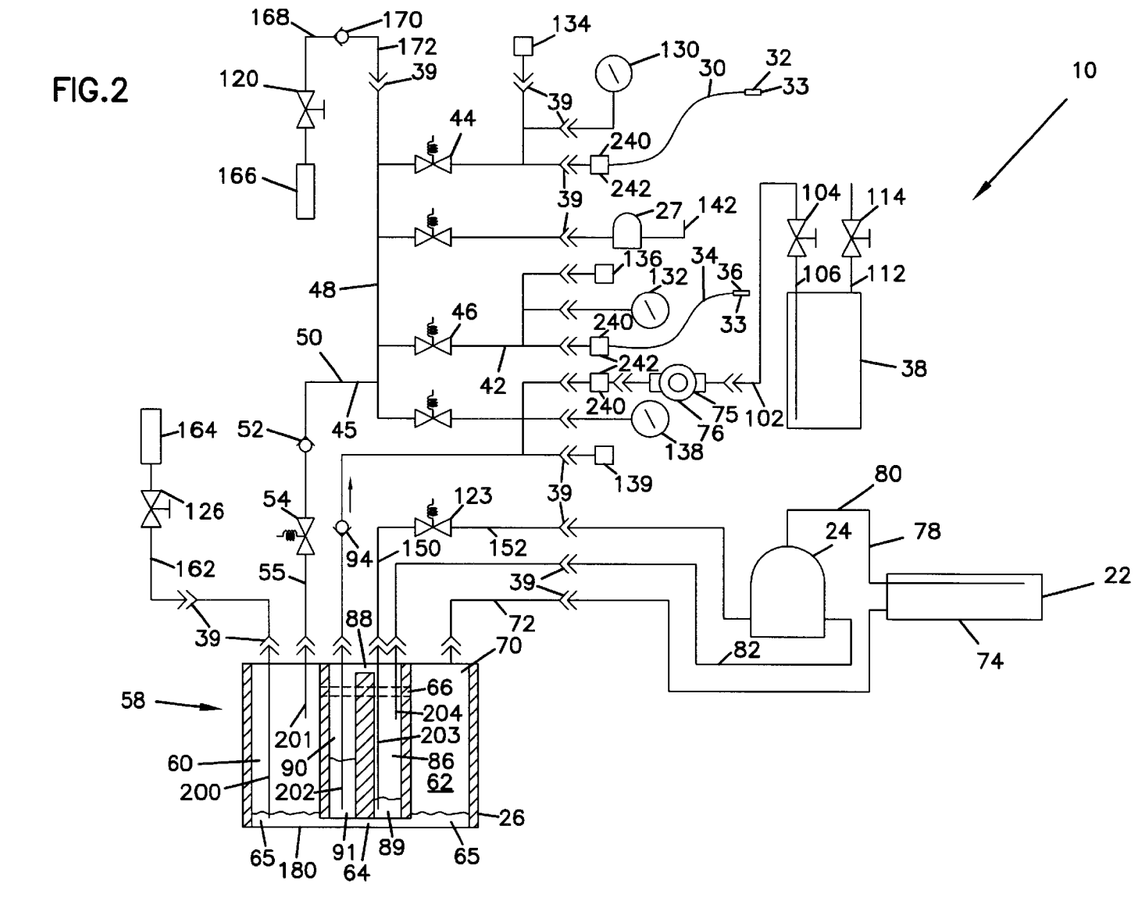
FIG. 2 is a schematic representation of the apparatus for recovering and recycling refrigerant from an air conditioning unit of FIG. 1.

Now referring to FIGS. 1 and 2, a portable apparatus for recovering and recycling refrigerant according to the invention is provided at reference 10. The apparatus 10 can be referred to as a single pass apparatus because the refrigerant passes through the system essentially once for purification, rather than being processed in a loop. The apparatus 10 includes a housing 12 on a wheeled cart 14. Additionally included is a handle 16 for allowing one to push the apparatus 10 on wheels 18. A control panel 20 is provided for operating the apparatus. A microprocessor 21 is provided for controlling the operation of the apparatus. A gas analyzer 23 can be provided.

The components of the apparatus 10 through which refrigerant flows include a filter 22, a compressor 24, a separation unit 26, a manifold assembly 28, a low pressure hose 30, a low pressure hose fitting 32, a high pressure hose 34, a high pressure hose fitting 36, and a receiver tank or refrigerant storage tank 38. Additionally included is a fan 37 for directing air across the separation unit 26, a vacuum pump 27, and a scale 29 for weighing the storage tank 38. It should be appreciated that the various components are in fluid connectivity via tubing or conduits which are not shown in FIG. 1 but are depicted in FIG. 2.

The apparatus for recovering and recycling refrigerant 10 is capable of performing several operations. A first operation includes the recovery of refrigerant from an air conditioning unit. In general, this involves the recycling of the used refrigerant found in an air conditioning unit (such as an automobile air conditioning unit) or a refrigeration unit (such as a refrigerator or freezer) to provide a purified refrigerant which can be introduced into an air conditioning unit or a refrigeration unit as new or recycled refrigerant. Another operation includes the evacuation of an air conditioning unit or a refrigeration unit in order to dry out its lines. Another operation includes the charging of purified refrigerant into an air conditioning unit or a refrigeration unit.

Now with reference to FIG. 2, the recovery and recycling of contaminated refrigerant from an air conditioning unit is discussed in detail. The following description generally follows the operation of the apparatus 10 for processing contaminated refrigerant recovered from an automobile air conditioning unit to provide a purified refrigerant, evacuating the air conditioning unit, and then charging purified refrigerant into the air conditioning unit. It should be understood that the phrase "contaminated refrigerant" refers to the refrigerant recovered from an air conditioning unit or refrigeration unit. The phrase "contaminated refrigerant" does not require a particular degree of contamination. The contaminated refrigerant may be relatively old or new, and may contain varying amounts of impurities which can be separated from the refrigerant to provide a purified refrigerant for charging into an air conditioning unit or refrigeration unit. The contaminated refrigerant is likely to include particulates, oil, water, and air which should be removed to a desired extent to provide purified refrigerant which can then be introduced back into an automobile air conditioning system. In the context of the following description, the refrigerant can be referred to as the processing fluid. Although the following description is in the context of recycling refrigerant from an automobile air conditioning unit, it can be applied to other types of air conditioning units and to refrigeration units.

The phrases "high pressure" and "low pressure" are used to describe the general condition of the processing fluid. For example, high pressure processing fluid can generally be found downstream of a compressor. In contrast, low pressure processing fluid can generally be found upstream of a compressor. The phrases high pressure processing fluid and low pressure processing fluid should not be construed as to require a particular pressure value.

The low pressure hose 30 is connected to the low pressure side of an automobile air conditioning unit via the low pressure hose fitting 32. The high pressure side hose 34 is connected to the high pressure side of an automobile air conditioning unit via the high pressure hose fitting 36. The hose fittings 32 and 36 include valves 33 which, once attached to the appropriate port on the automobile air conditioning system, can be opened to provide flow therethrough. The low pressure hose 30 and the high pressure hose 34 connect to the manifold assembly 28. Much of the flow through the apparatus 10 is directed by the flow through the manifold assembly 28. Much of the schematic shown in FIG. 2 is a representation of the flow through the manifold assembly 28. The double arrows 39 indicate the exterior surface 29 of the manifold assembly 28. Accordingly, FIG. 2 schematically illustrates the flow within the manifold assembly 28 as corresponding to the lines or conduits within the double arrows 39. An advantage of the manifold assembly 28 is that it provides a reduction in the amount of tubing, such as copper tubing, from the amount used in many prior refrigerant recycling apparatuses. The passageways and interconnected passageways within the manifold assembly 28 direct the flow of refrigerant.

Contaminated refrigerant 45 flows from the low pressure side hose 32 through the low pressure conduit 40 and from the high pressure side hose 34 through the high pressure conduit 42. As contaminated refrigerant flows into the apparatus 10, the low pressure conduit valve 44 and the high pressure conduit valve 46 are open. Contaminated refrigerant then flows through conduits 48 and 50, through recovery check valve 52, through recovery valve 54 which is open, through the contaminated refrigerant inlet line 55 and into the separation unit 26. The recovery check valve 52 provides one-way flow of contaminated refrigerant into the separation unit 26.

The separation unit 26 functions as a combination heat exchanger/evaporator/condenser and oil separator. The separation unit 26 includes multiple chambers. See FIG. 4. The separation unit 26 is arranged to provide a bottom region 57 and a top region 58. Liquid (i.e., condensates) tends to collect in the bottom region 57, and gas (i.e., volatiles) tends to collect in the top region 58. The contaminated refrigerant is introduced into a first evaporation chamber 60 which is in communication with a second evaporation chamber 62. The first evaporation chamber 60 is in communication with the second evaporation chamber 62 via a first evaporator conduit 64 and a second evaporator conduit 66. The first evaporator conduit 64 is provided in the bottom region 56 of the separation unit 26 and is provided to allow flow of oil between the two evaporation chambers 60 and 62. The second evaporator conduit 66 is provided in the top region 58 for providing flow of gas between the evaporator chambers 60 and 62. It is generally not desirable for gaseous refrigerant to bubble or percolate through oil 65 puddled at the bottom of the separation unit 26. Accordingly, the second evaporator conduit 66 allows volatilized refrigerant to flow directly into the second evaporation chamber 62.

Figure 4:
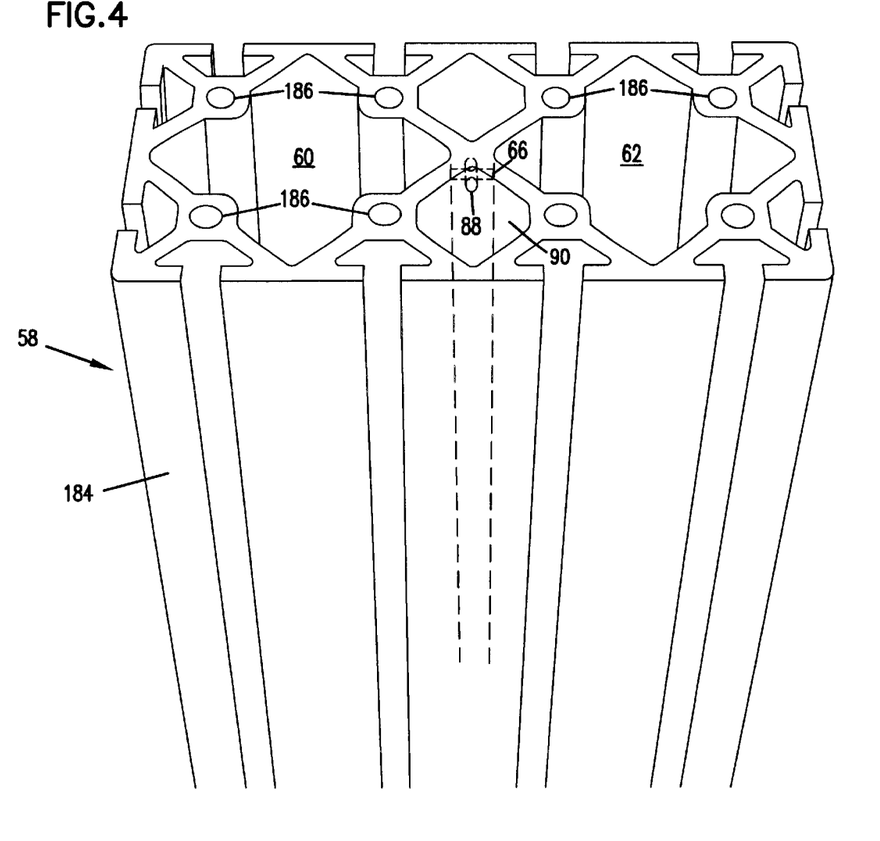
FIG. 4 is a perspective, cut away view of the separation unit of the apparatus for recovering and recycling refrigerant according to the principles of the invention.

As contaminated refrigerant flows into the first evaporation chamber 60, the refrigerant may be entirely liquid, entirely gaseous, or a mixture of liquid and gas. Heat transfers to the contaminated refrigerant causing vaporization of the refrigerant. Oil and other nonvolatiles collect in the bottom region 57 of the first and second evaporation chambers 60 and 62. The first evaporator conduit 64 provides for fluid communication of liquid (i.e., nonvolatiles and liquid refrigerant) between the first and second evaporation chamber 60 and 62. Vaporous refrigerant generally flows through the second evaporator conduit 66 and into the second evaporator chamber 62. If nonvolatiles are not clogging the first evaporator conduit 64, the vaporous refrigerant can flow through the first evaporator conduit 64 and into the second evaporation chamber 62. In an alternative embodiment of the invention, it is possible to provide only one evaporation chamber. That is, the separation unit can be provided with a single evaporation chamber which provides for the volatilization of refrigerant and the separation of refrigerant from nonvolatiles.

The reference to "volatilized" components refers to the components leaving the separation unit 26 in a gaseous state. There is no requirement that the volatilized components are volatilized within the separation unit. It is possible that part of the volatilized components is gaseous prior to introduction into the separation unit 26. The volatilized components generally include refrigerant, moisture and air. It should be understood that if moisture and/or air are not present in the contaminated refrigerant, it is expected that they would not be present in the volatilized components. The volatilized components 70 exit the second evaporator chamber 62 via volatilized components line 72.

The volatilized components flow through the filter 22. The filter is preferably a desiccant filter 74 which removes water from the refrigerant. A commercially available desiccant filter which can be used in the invention is available from Alco, Inc. A site glass 75 can be provided for determining when it is appropriate to replace the desiccant filter. If the water concentration in the purified refrigerant is too high, the desiccant filter should be replaced. It is expected that the desiccant filter will be replaced after about 30 hours of operation or after having serviced about 150 automobile air conditioning units. Preferably, the site glass 75 includes a moisture indicator 76 which shows a green color when the purified refrigerant is sufficiently moisture free. When the moisture indicator 76 turns yellow, the water concentration in the purified refrigerant is too high, and the desiccant filter should be replaced.

The refrigerant leaves the filter 74 via line 78 and passes through the compressor 24. After leaving the filter 74, the refrigerant can be referred to as purified refrigerant. A commercially available compressor which can be used in this invention is a ⅓ HP compressor. In general, it is expected that the compressor 24 will compress a purified refrigerant 80 to a pressure of at least about 100 psi. While passing through the compressor 24, the purified refrigerant 80 tends to pick up small amounts of oil from the compressor. In order to maintain proper functioning of the compressor 24, it is desirable to remove the oil from the refrigerant and return it to the compressor. The concept of returning oil to a compressor is not new and commercially available oil separators have been sold for this purpose for several years. An exemplary company that provides compressor oil separators is Temprite, Inc. The applicants discovered that the oil can be removed from the purified refrigerant 80 in the separation unit 26. That is, a separate compressor oil separator is not required by the invention, and is preferably not included as part of the apparatus 10, although it can be included.

The purified refrigerant 80 leaves the compressor 24 via high pressure line 82 and is introduced into the first high pressure chamber 86. Gaseous purified refrigerant flows via the high pressure conduit 88 into the second high pressure chamber 90. The purified refrigerant is generally provided at a fairly high temperature as a result of the action of the compressor 24. Accordingly, heat flows from the purified refrigerant to the contaminated refrigerant provided within the separation unit 26. In view of this heat transfer, it is expected that the compressor oil 89 will condense at the bottom region 57 of the first high pressure chamber 86. It is expected that the purified refrigerant that condenses in the bottom region 57 of the second high pressure chamber 90 will be essentially free of oil.

The condensed purified refrigerant 91 provided at the bottom of the second high pressure chamber 90 is removed from the separation unit 26 via the condensed refrigerant outlet line 92 and through the check valve 94. The condensed refrigerant then flows through line 96 and through the moisture indicator 75. The purified refrigerant then flows through line 102, through the open tank valve 104, through the tank refrigerant line 106 and into the refrigerant storage tank 38 where the condensed, purified refrigerant is stored. A scale 29 is provided for measuring the mass of refrigerant within the tank 38. By measuring the mass, temperature and pressure within the tank 108, the amount of air provided in the tank 38 can be calculated and bled out through the air bleed line 112 and the air outlet valve 114.

During the recovery operation, the low pressure conduit valve 44, the high pressure conduit valve 46, the recovery valve 54, and the tank valve 104 are open. The oil injection valve 120, the evacuation valve 122, the charge valve 124, the compressor oil return valve 123, the oil drain valve 126, and the air outlet valve 114 are closed.

The low pressure gauge 130 and the high pressure gauge 132 are provided for observing the pressure within the low pressure conduit 40 and the high pressure conduit 42, respectively. Pressure switches 134 and 136 are provided for detecting low pressure and high pressure conditions in the low pressure conduit 40 and the high pressure conduit 42, respectively. A refrigerant tank gauge 138 is provided for observing the pressure within the refrigerant storage tank 38. A pressure switch 139 is provided for detecting pressure conditions in the refrigerant storage tank 38. Once the pressure switch 134 detects a predetermined low pressure in the low pressure conduit 40, a signal is provided to a microprocessor and the recovery valve 54 closes and the compressor 24 turns off. The evacuate valve 122 then opens and the vacuum pump 27 turns on to further evacuate and dry out the air conditioning unit. Typically, the vacuum pump 27 is vented to the atmosphere via atmospheric vent line 142. After running for a period of time, the evacuate valve 122 closes and the vacuum pump 27 turns off.

Once the pressure inside the automobile air conditioning unit decreases to a predetermined level, such as eight inches of mercury, it is expected that almost all of the refrigerant has been evacuated and small amounts of air and moisture remain in the automobile air conditioning unit. Thus, the vacuum pump 27 vents to the atmosphere. Once the vacuum pump 27 has run for a predetermined length of time, such as between 5 and 60 minutes, it is believed that the automobile air conditioning unit is ready to be charged with purified refrigerant. Preferably, the vacuum pump 27 is at least a 1.5 cfm pump, and more preferably a 7 cfm pump.

While the compressor 24 and the separation unit 26 are pressurized, the oil return valve 120 and the oil drain valve 126 are opened to allow oil to drain from the separation unit 26. That is, compressor oil 89 flows through the compressor oil outlet line 150, through the compressor oil return valve 123, through the oil return line 152 and into the compressor 24. The refrigerant oil 65 flows through the refrigerant oil recovery line 162, through the oil drain valve 126, and into the oil drain 164. The opening of the compressor oil return valve 123 additionally helps balance the pressure across the compressor 24 which is believed to assist in start up. Once the oil has been removed from the separation unit 26, the valves 126 and 123 are closed. It is expected that the compressor oil 89 may contain condensed refrigerant. It is expected that the refrigerant will vaporize in the compressor 24 and then circulate back into the separation unit 26.

The amount of oil provided in the oil drain 164 is preferably measured. This allows one to determine how much oil needs to be reintroduced into the air conditioning unit. In general, it is expect that the quantity of oil recovered from an air conditioning unit should be replaced. The observation of the amount of oil recovered can be a visual observation of a volume of oil. The corresponding volume of fresh oil 166 can then be injected through the oil injection valve 120 via oil inlet line 168, oil inlet check valve 170, and oil inlet line 172. It is expected that the fresh oil 166 will flow into the air conditioning unit because of the low pressure condition created by the vacuum pump 27. If all of the oil does not flow into the air conditioning unit, it is expected that the subsequent charge of refrigerant into the air conditioning unit will help introduce the oil into the air conditioning unit.

After refrigerant has been recovered from an air conditioning unit and the air conditioning unit has been evacuated, refrigerant can be introduced into the air conditioning unit. The tank valve 104, the charge valve 124, the low pressure conduit valve 44, and the high pressure conduit valve 46 are open while a predetermined amount of refrigerant is introduced into the air conditioning system. After the predetermined amount of refrigerant leaves the refrigerant tank 38, the valves close and the fittings 32 and 36 can be removed from the air conditioning unit. The charge to the automobile air conditioning unit is determined based upon the unit specification. Based upon the information provided by the weight scale 29, the microprocessor 21 determines the length of time the refrigerant tank valve 104 remains open in order to provide the desired charge to the automobile air conditioning unit.

Referring to separation unit 26, it is pointed out that there are several tubes of varying lengths which extend into the several chambers. A refrigerant oil recovery tube 200 is provided extending into the bottom region 57 in order to recover condensed compressor refrigerant oil 65. A contaminated refrigerant tube 201 is provided extending into the upper region 58. A condensed refrigerant recovery tube 202 is provided extending into the bottom region 57 for recovery of condensed refrigerant. A compressor oil recovery tube 203 is provided extending into the lower region 57 for recovery of condensed compressor oil 89. A compressed refrigerant tube 204 is provided for introducing compressed refrigerant into the upper region 58. In general, the tube 204 extends sufficiently far down to avoid the likelihood of compressor oil flowing into the second high pressure chamber 90.

Figure 5:
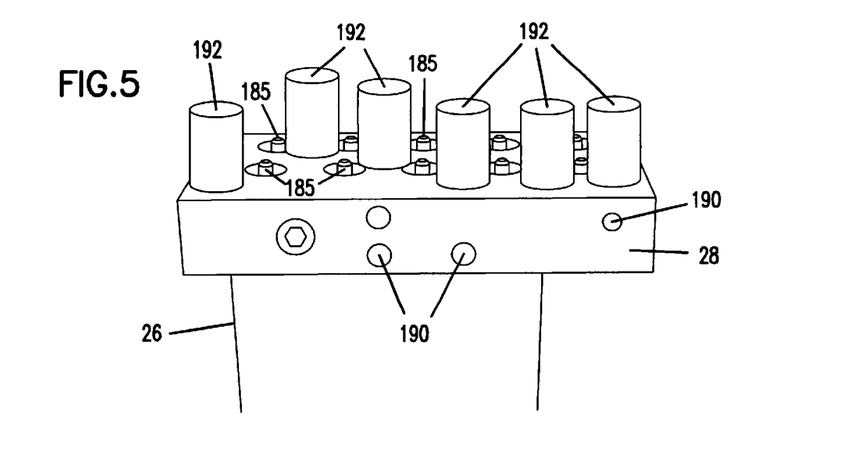
FIG. 5 is a perspective view of the combination separation unit and manifold assembly according to the principles of the invention.

Now referring to FIGS. 4 and 5, the separation unit 26 and the combination of the separation unit 26 and the manifold assembly 28 are shown in detail. The separation unit 26 includes first and second low pressure chambers 60 and 62 and first and second high pressure chambers 86 and 90. It is an advantage of the invention that the separation unit 26 can be formed by extruding metal, such as, aluminum. In general, the metal is preferably one which provides for good heat transfer. By providing several chambers, the applicants were able to avoid the use of coils which are often found in prior refrigerant recovery apparatuses. The separation unit 26 can include a bottom plate or cover 180. The manifold assembly 28 can function as the top or cover 182. In addition, bolts 184 can be provided extending through the top 182, the extrusion 184, and the bottom cover 180. The extrusion 184 preferably includes holes 186 through which the bolts 185 extend. Accordingly, the manifold assembly 28 and the separation unit 26 can be held tightly together.

The manifold assembly 28 preferably includes interconnecting passageways 190 which are schematically depicted by FIG. 2. The valves 44, 122, 46, 124, 54 and 123 are preferably solenoid valves and are depicted in FIG. 5 by reference numeral 192.

Figure 3:
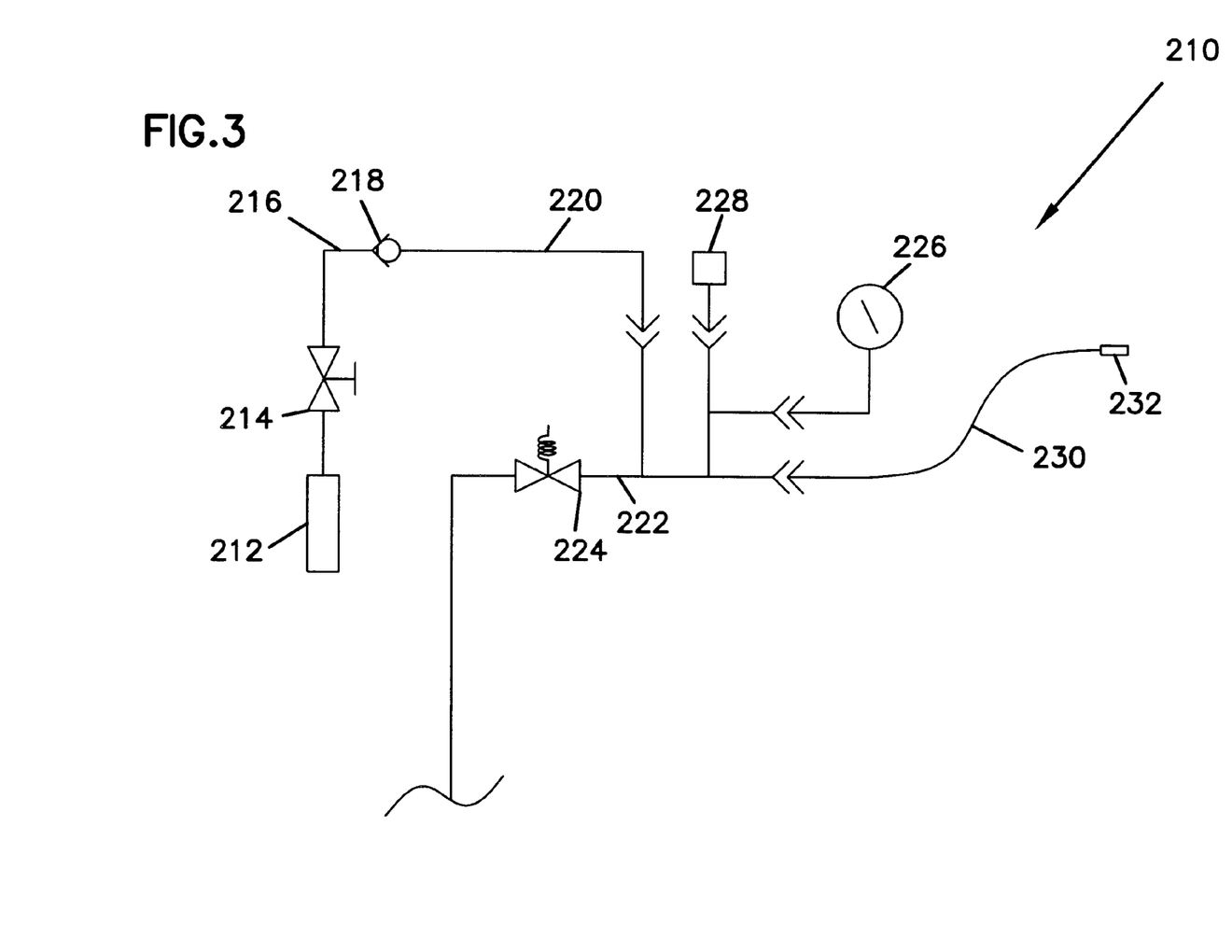
FIG. 3 is a schematic representation of a partial, alternative embodiment of an apparatus and method for recovering and recycling refrigerant according to the principles of the invention.

Now referring to FIG. 3, an alternative embodiment of an apparatus and method for recovering and recycling refrigerant is provided at reference numeral 210. The apparatus 210 includes fresh oil 212 which can be injected through the oil injection valve 214 via oil inlet line 216, oil inlet check valve 218, and oil inlet line 220. The oil then flows into the refrigerant recovery and delivery line 222 which can be either the high pressure line or the low pressure line. A valve 224 is provided to control flow through the line 222. A pressure gauge 226 is provided for observing the pressure in the line 222 and a pressure switch 228 is provided for detecting pressure conditions within the line 222. In addition, a hose 230 and a fitting 232 are provided for attaching to an air conditioning unit or a refrigeration unit. The remainder of the apparatus can be configured similar to that shown in FIG. 2

It should be appreciated that while the recovery of contaminated refrigerant and the charging of purified refrigerant is described in the context of using both a high pressure connection and a low pressure connection to an air conditioning unit or a refrigeration unit, it should be understood that the invention can be practiced using a single line for recovery and/or charging.

Figure 6:
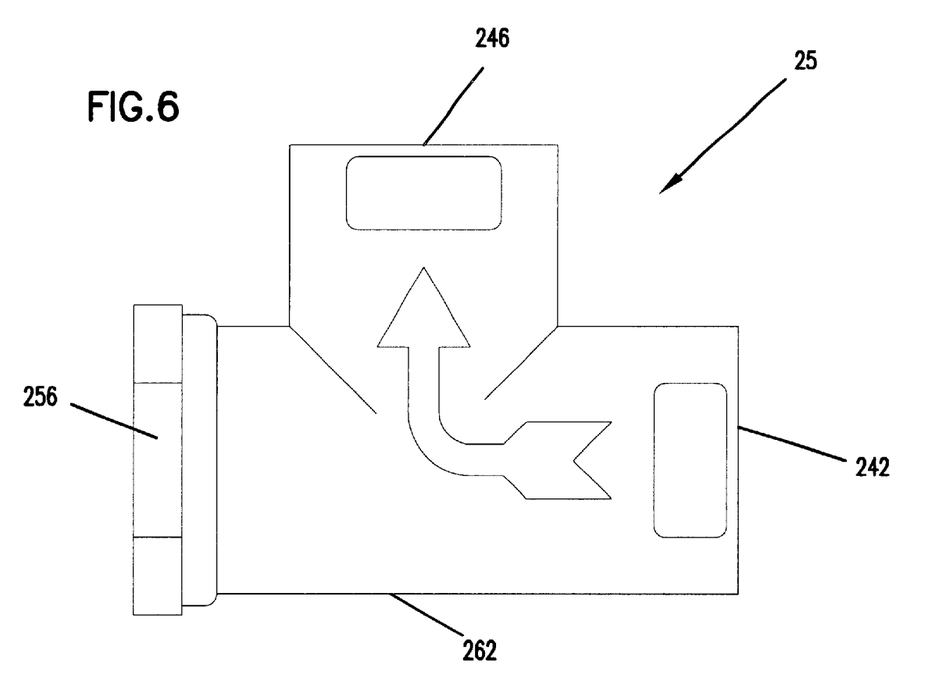
FIG. 6 is a side view of a trap according to the principles of the invention.
Figure 7:
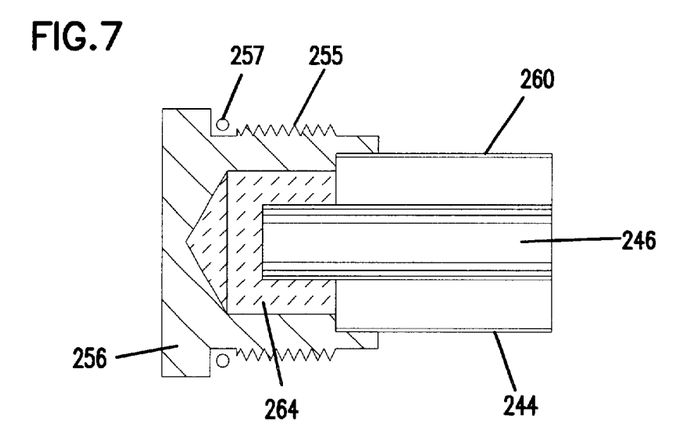
FIG. 7 is a sectional view of the trap of FIG. 6 taken along lines 6—6.

The apparatus 10 preferably includes filters 240 for obstructing the flow of certain sized particulate and/or fibrous materials into the apparatus. Preferably, the filters 240 are provided between the low pressure hose 30 and the manifold assembly 28 and between the high pressure hose 34 and the manifold assembly 28. A filter 240 can additionally be provided between the purified refrigerant line 102 and the manifold assembly 28. The filters 240 can be provided with screens 242 which provide the filtering. A preferred embodiment of the filters 240 are depicted in FIGS. 6 and 7 at reference numeral 250. The filter 250 can be referred to as a magnet and screen filter. The magnet and screen filter 250 includes an inlet 242, a screen 244, a magnet 246 and an outlet 248. As refrigerant flows from the inlet 242 to the outlet 248, metallic particulates become magnetically attached to the magnet 246. Non-metallic particulates or fibers can be caught by the screen 244. As shown, the screen is preferably provided as a cylindrical screen 260, and the magnet 246 is preferably attached to the filter housing 262 by adhesive 264 which can be an epoxy adhesive. The portion of the filter housing 262 to which the magnet 246 is attached is preferably a plug 256 which can be removed so as to clean the filter. As shown, the plug 256 includes threads 255 for screwing into the housing 262. A gasket 257 can be provided. Preferably, the plug 256 can be unscrewed from its location and then replaced by screwing back into its location. The screen 244 can be attached to the plug 256.

The magnet and screen filter 250 is advantageous because it provides for trapping of metallic particles which may otherwise become attached to the solenoid valves and result in clogging of the solenoid valves. The magnet and screen filters are preferably provided outside of the manifold assembly and attached to the hoses which are used to service the air conditioning units or refrigeration units.

Figure 8:
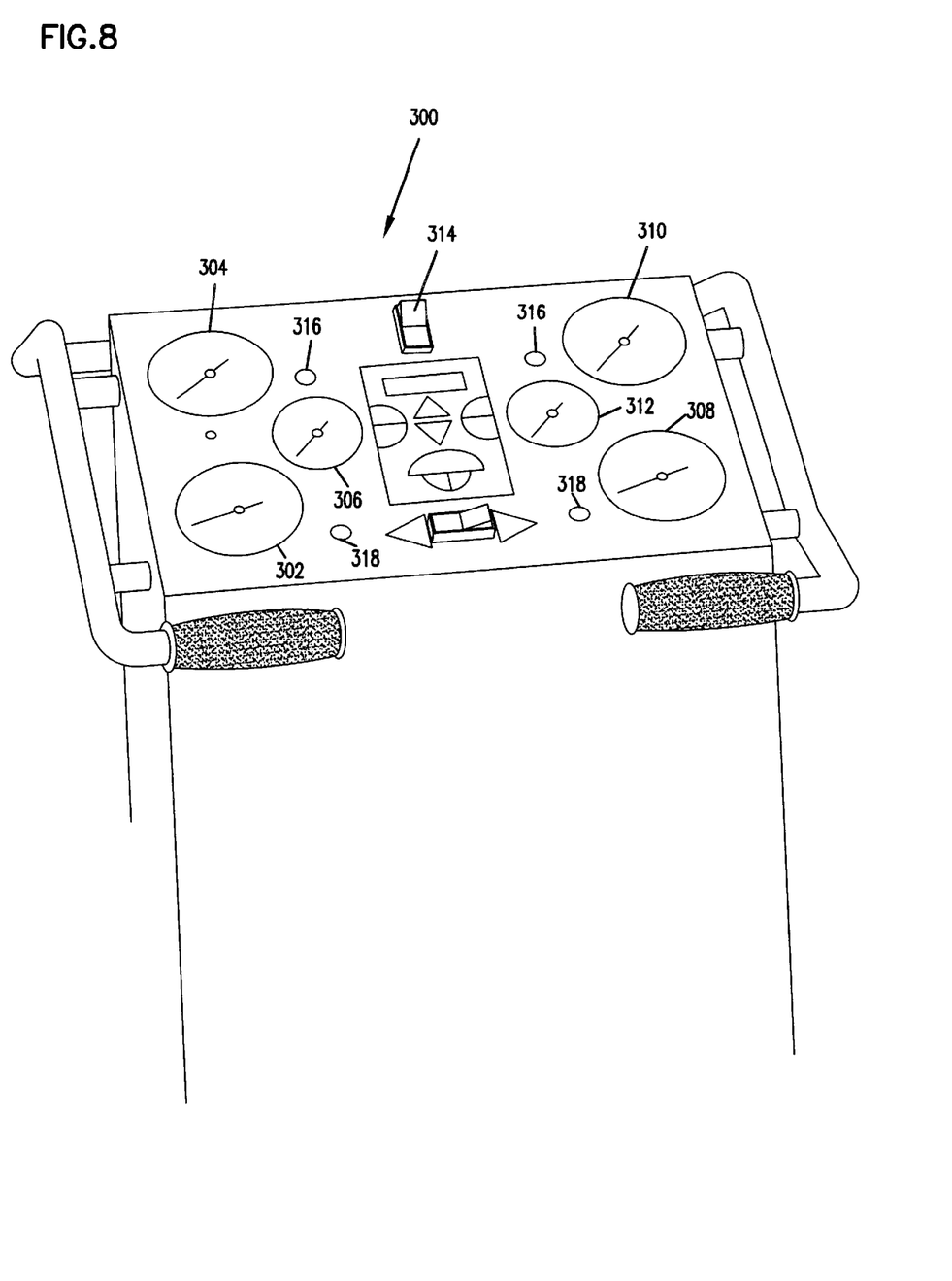
FIG. 8 is a plan view of the control panel of a dual refrigerant recovery and recycling apparatus according to the principles of the invention.

Now referring to FIG. 8, an alternative embodiment of the apparatus for recovering and recycling refrigerant is indicated at reference numeral 300. The apparatus can be referred to as a dual refrigerant recovery and recycling apparatus because it is capable of handling two different types of refrigerant. The operation of the apparatus is similar to the operation of the apparatus described in FIG. 2. In general, two separate apparatuses are combined together. One apparatus can be used for the recovery of R-134a refrigerant and the other apparatus can be used for the recovery of R-12 refrigerant. The vacuum pump 27 can be provided as a shared piece of equipment between the two apparatuses. A prior dual refrigerant recovery apparatus is described in U.S. Pat. No. 5,934,091 to Hanson, et al., the entire disclosure of which is incorporated herein by reference.

As shown in FIG. 8, a low pressure gauge 302, a high pressure gauge 304, and a tank pressure gauge 306 are provided for observing the pressure in the apparatus for recovering one type of refrigerant. Furthermore, a low pressure gauge 308, a high pressure gauge 310, and a tank pressure gauge 312 are provided for observing the pressure conditions in the apparatus for recovering a different type of refrigerant. In addition, a power switch 314 is provided for turning on the apparatus, a high pressure warning lights 316 are provided for identifying when pressure conditions reach a potentially dangerous state, air purge buttons 318 are provided for venting air from the refrigerant tanks, a switch 319 is provided for selecting which refrigerant to recover, and an operation panel 320 is provided for operating the apparatus.

Figure 9A:
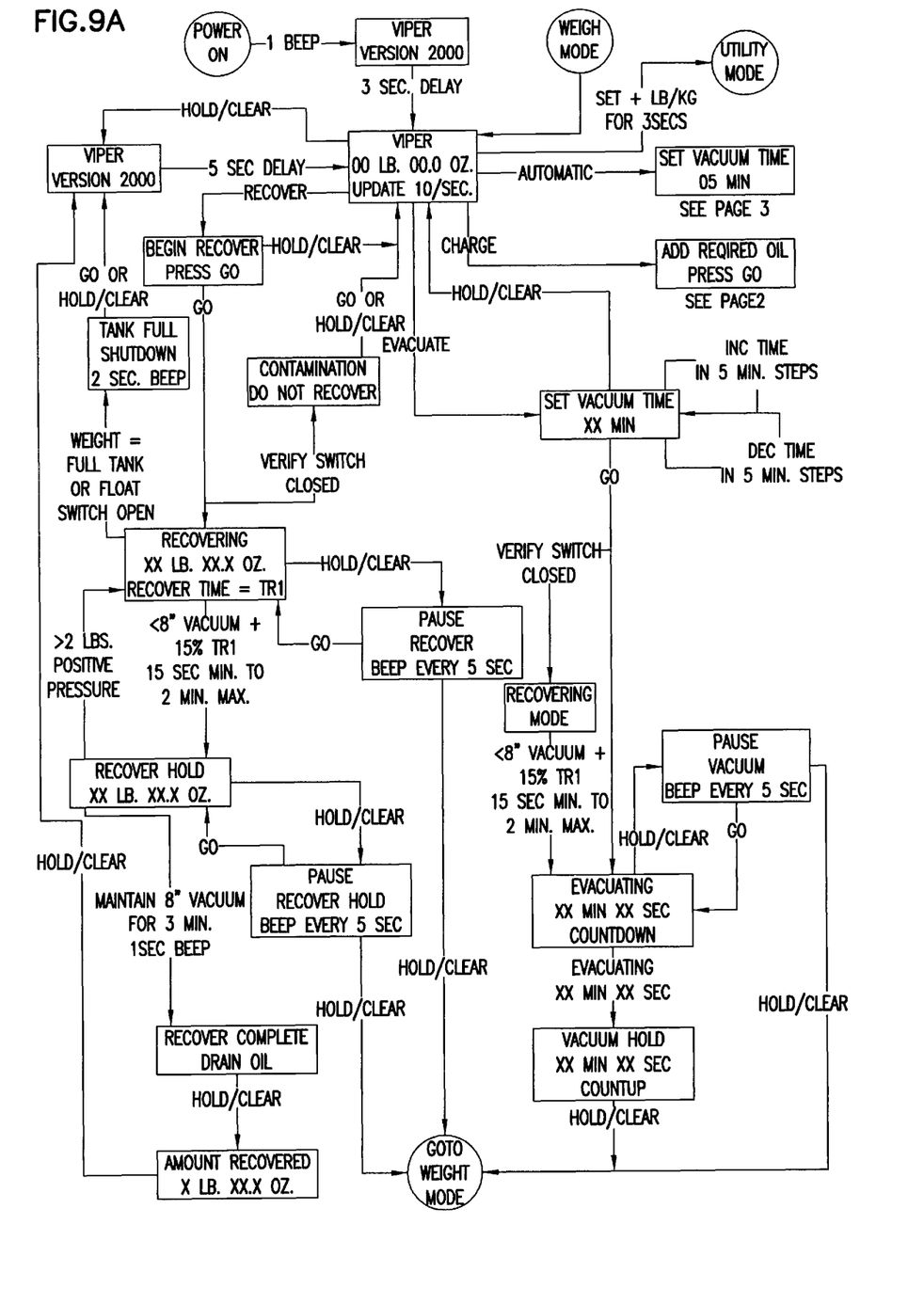
Figure 9B:
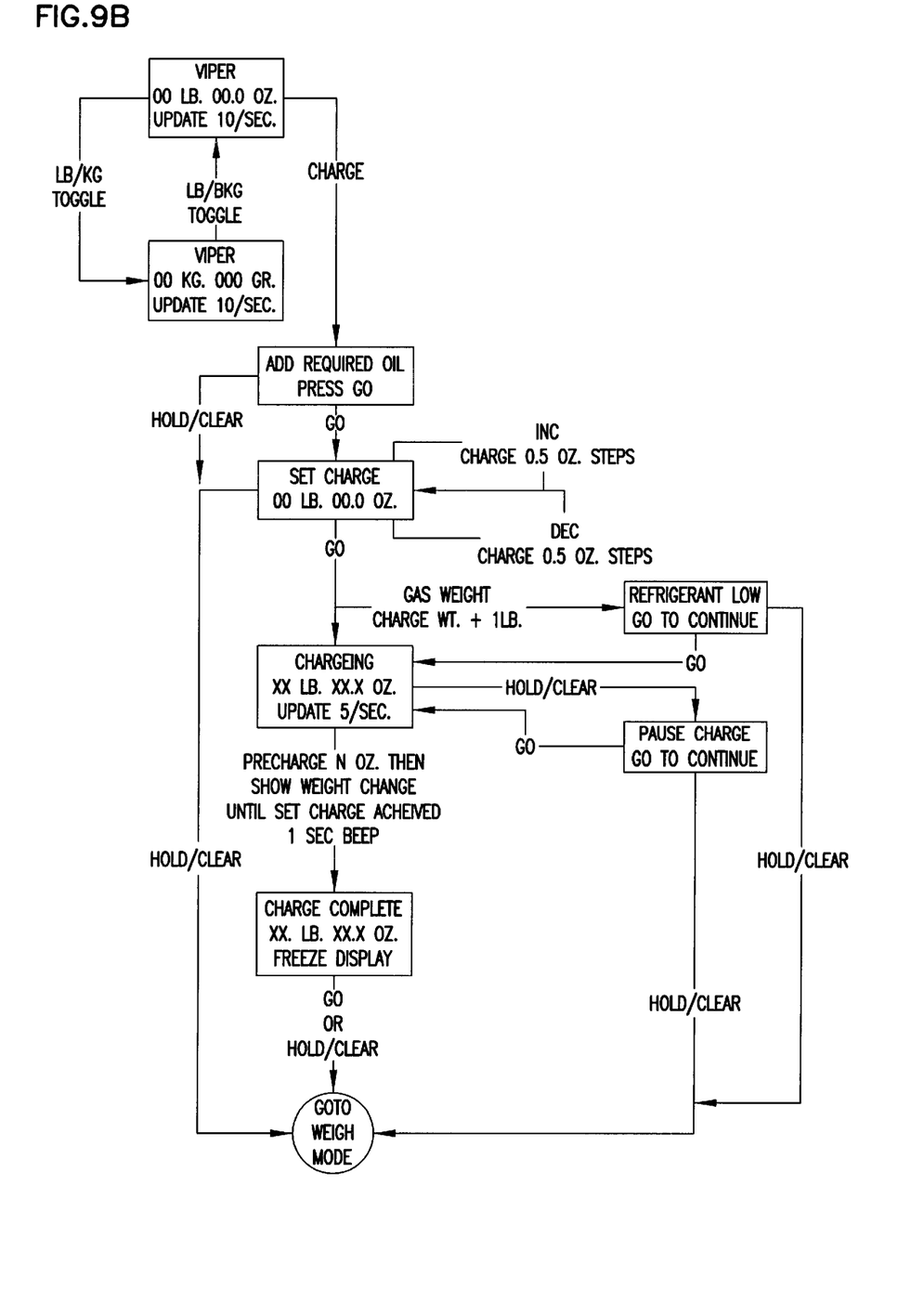
Figure 9C:
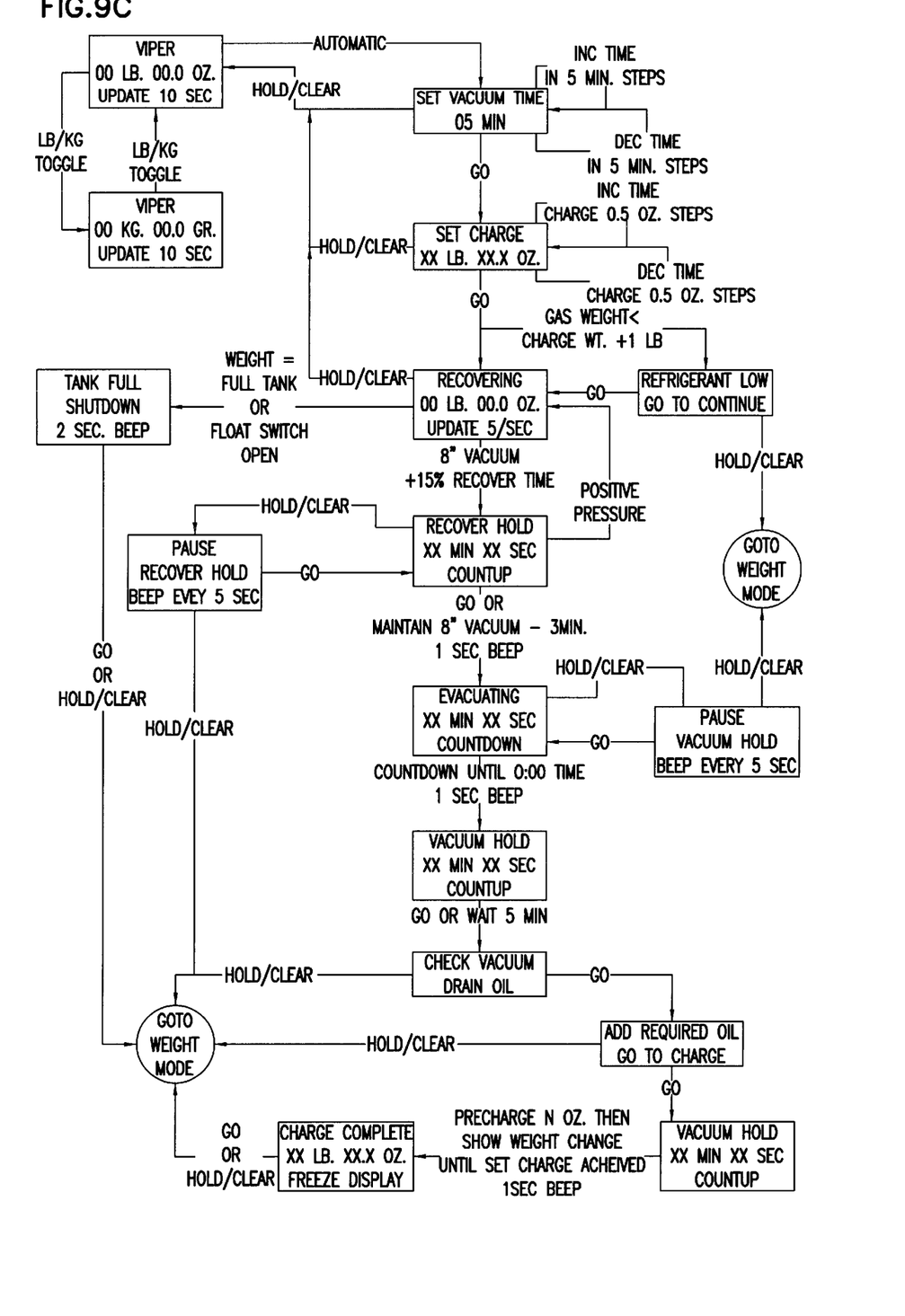

Now referring to FIGS. 9 (a)–(c), a process flow diagram is provided depicting an exemplary operation of an apparatus for recovering and recycling refrigerant according to the invention.

While the invention has been described in the context of recovering and recycling refrigerant from an automobile air conditioning unit, it should be understood that the principles of the invention, including the apparatus and method, can be applied to recovering and purifying refrigerant from other sources including refrigerators, freezers, and home and commercial air conditioning systems. In addition, it should be understood that the invention can be practiced for processing refrigerants including R-12, R-134A and other available refrigerants.

The above specification provides a complete description of the manufacture and use of the apparatus of the invention. Since many embodiments of the invention can be made without departing from the spirit and scope of the invention, the invention resides in the claims hereinafter appended.

We claim:

1. An apparatus for recovering and recycling refrigerant comprising:
    separation unit for condensing compressed refrigerant and for vaporizing contaminated refrigerant, the separation unit comprising a multichamber structure including:
        (i) high pressure region having high pressure inlet for providing compressed refrigerant vapor to the high pressure region, high pressure outlet for removing condensed refrigerant from the high pressure region, and compressor oil outlet for removing compressor oil from the high pressure region; and
        (ii) low pressure region having low pressure inlet for introducing contaminated refrigerant into the low pressure region, low pressure outlet for removing vaporized refrigerant from the low pressure region, and refrigerant oil outlet for removing refrigerant oil from the low pressure region;
    filter for filtering contaminated refrigerant prior to introduction into said separation unit, the filter comprises a magnet;
    compressor for compressing refrigerant from the low pressure outlet of said separation unit to provide compressed refrigerant for feeding to the high pressure inlet of said separation unit; and
    receiver tank for receiving condensed refrigerant from the high pressure outlet of said separation unit.

2. An apparatus for recovering and recycling refrigerant according to claim 1, further comprising a manifold assembly for directing flow of refrigerant into and out of the separation unit.

3. An apparatus for recovering and recycling refrigerant according to claim 2, said manifold assembly comprises:
    contaminated refrigerant recovery line for directing contaminated refrigerant into the low pressure region of said separation unit;
    vaporized refrigerant line for directing vaporized refrigerant from the low pressure region of said separation unit to said compressor;
    compressed refrigerant line for directing compressed refrigerant into the high pressure region of said separation unit; and
    condensed refrigerant line for directing condensed refrigerant from the high pressure region of said separation unit to said receiver tank.

4. An apparatus for recovering and recycling refrigerant according to claim 1, further comprising a dryer for removal of moisture from the vaporized refrigerant from the low pressure outlet of said separation unit.

5. A method for recovering and recycling refrigerant, said method comprising steps of:
    (a) feeding contaminated refrigerant to a separation unit, said separation unit provided for condensing compressed refrigerant and for vaporizing contaminated refrigerant, said separation unit comprising a multichamber structure including:
        (i) high pressure region having high pressure inlet for providing compressed refrigerant vapor to the high pressure region, high pressure outlet for removing condensed refrigerant from the high pressure region, and compressor oil outlet for removing compressor oil from the high pressure region;

(ii) low pressure region having low pressure inlets for introducing contaminated refrigerant into the low pressure region; low pressure outlet for removing vaporized refrigerant from the low pressure region, and refrigerant oil outlet for removing refrigerant oil from the low pressure region; and (iii) wherein the high pressure region of said separation unit comprises at least two chambers, each chamber being elongated to provide an upper region and a lower region, and including a conduit between the chambers in their upper regions to provide fluid communication between the chambers;

(b) compressing vaporized refrigerant from the low pressure outlet of said separation unit to provide compressed refrigerant vapor;

(c) feeding said compressed refrigerant vapor to the high pressure inlet of the high pressure region of said separation unit;

(d) separating oil from said compressed refrigerant and recovering the oil in the high pressure region of said separation unit;

(e) condensing said compressed refrigerant to provide condensed refrigerant within the high pressure region of said separation unit; and (f) feeding the condensed refrigerant from the high pressure outlet of said separation unit to a receiver tank.

6. An apparatus for recovering and recycling refrigerant comprising:

a separation unit for condensing compressed refrigerant and for vaporizing contaminated refrigerant, said separation unit comprising a high pressure region and a low pressure region;

compressor for compressing refrigerant from the low pressure region of said separation unit to provide compressed refrigerant for feeding to the high pressure region of said separation unit;

receiver tank for receiving condensed refrigerant from the high pressure region of said separation unit; and a filter for filtering contaminated refrigerant prior to introduction of the contaminated refrigerant into said separation unit, said filter comprising a screen and a magnet.

7. An apparatus for recovering and recycling refrigerant comprising:

separation unit for condensing compressed refrigerant and for vaporizing contaminated refrigerant, the separation unit comprising a multichamber structure including:

(i) high pressure region having high pressure inlet for providing compressed refrigerant vapor to the high pressure region, high pressure outlet for removing condensed refrigerant from the high pressure region, and compressor oil outlet for removing compressor oil from the high pressure region;

(ii) low pressure region having low pressure inlet for introducing contaminated refrigerant into the low pressure region, low pressure outlet for removing vaporized refrigerant from the low pressure region, and refrigerant oil outlet for removing refrigerant oil from the low pressure region; and (iii) the separation unit comprises extruded aluminum containing four chambers;

compressor for compressing refrigerant from the low pressure outlet of said separation unit to provide compressed refrigerant for feeding to the high pressure inlet of said separation unit; and receiver tank for receiving condensed refrigerant from the high pressure outlet of said separation unit.

8. An apparatus for recovering and recycling refrigerant comprising:

separation unit for condensing compressed refrigerant and for vaporizing contaminated refrigerant, the separation unit comprising a multichamber structure including:

(i) high pressure region having high pressure inlet for providing compressed refrigerant vapor to the high pressure region, high pressure outlet for removing condensed refrigerant from the high pressure region, and compressor oil outlet for removing compressor oil from the high pressure region;

(ii) low pressure region having low pressure inlet for introducing contaminated refrigerant into the low pressure region, low pressure outlet for removing vaporized refrigerant from the low pressure region, and refrigerant oil outlet for removing refrigerant oil from the low pressure region; and (iii) wherein the high pressure region of said separation unit comprises at least two chambers, each chamber being elongated to provide an upper region and a lower region, and including a conduit between the chambers in their upper regions to provide fluid communication between the chambers;

compressor for compressing refrigerant from the low pressure outlet of said separation unit to provide compressed refrigerant for feeding to the high pressure inlet of said separation unit; and receiver tank for receiving condensed refrigerant from the high pressure outlet of said separation unit.

9. An apparatus for recovering and recycling refrigerant comprising:

separation unit for condensing compressed refrigerant and for vaporizing contaminated refrigerant, the separation unit comprising a multichamber structure including:

(i) high pressure region having high pressure inlet for providing compressed refrigerant vapor to the high pressure region, high pressure outlet for removing condensed refrigerant from the high pressure region, and compressor oil outlet for removing compressor oil from the high pressure region;

(ii) low pressure region having low pressure inlet for introducing contaminated refrigerant into the low pressure region, low pressure outlet for removing vaporized refrigerant from the low pressure region, and refrigerant oil outlet for removing refrigerant oil from the low pressure region; and (iii) wherein the low pressure region of said separation unit comprises at least two elongated chambers, each elongated chamber having an upper region and a lower region, and including a conduit between the chambers in their upper regions and a conduit between the chamber in their lower regions to provide fluid communication between the chambers.

compressor for compressing refrigerant from the low pressure outlet of said separation unit to provide compressed refrigerant for feeding to the high pressure inlet of said separation unit; and receiver tank for receiving condensed refrigerant from the high pressure outlet of said separation unit.

* * * * *